(12) United States Patent
Krishnan et al.

(10) Patent No.: US 12,222,930 B2
(45) Date of Patent: Feb. 11, 2025

(54) SELECTIVE LOGGING AND WHEEL OF TIME FOR VEHICLE NETWORK LOGGER SYSTEM

(71) Applicant: GM Cruise Holdings LLC, San Francisco, CA (US)

(72) Inventors: Narayanan Vinay Krishnan, San Francisco, CA (US); Yang Liu, Santa Clara, CA (US); Aditya Immaneni, Foster City, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 18/342,171

(22) Filed: Jun. 27, 2023

(65) Prior Publication Data

US 2025/0005015 A1 Jan. 2, 2025

(51) Int. Cl.
*G06F 16/00* (2019.01)
*G06F 16/22* (2019.01)
*G06F 16/23* (2019.01)

(52) U.S. Cl.
CPC ...... *G06F 16/2379* (2019.01); *G06F 16/2228* (2019.01)

(58) Field of Classification Search
CPC .................. G06F 16/2379; G06F 16/2228
See application file for complete search history.

(56) References Cited

U.S. PATENT DOCUMENTS

| | | | | |
|---|---|---|---|---|
| 6,820,263 | B1* | 11/2004 | Klappholz | G06F 9/52 718/107 |
| 7,506,046 | B2* | 3/2009 | Rhodes | H04L 43/00 709/224 |
| 10,891,502 | B1* | 1/2021 | Chan | G06V 20/597 |
| 10,943,136 | B1* | 3/2021 | Chan | G06V 10/34 |
| 11,068,730 | B1* | 7/2021 | Chan | B60W 40/08 |
| 11,281,920 | B1* | 3/2022 | Chan | G06V 40/103 |
| 11,321,951 | B1* | 5/2022 | Chan | B60W 50/14 |
| 11,423,671 | B1* | 8/2022 | Chan | G06V 20/597 |
| 11,587,091 | B1* | 2/2023 | Lesesky | G06Q 20/3226 |
| 11,770,388 | B1* | 9/2023 | Laconic | H04L 67/12 726/23 |
| 11,770,677 | B1* | 9/2023 | Lesesky | H04W 4/48 455/456.1 |
| 11,816,757 | B1* | 11/2023 | Summers | G06F 3/012 |

(Continued)

*Primary Examiner* — Alexander Khong
(74) *Attorney, Agent, or Firm* — Dimitri Kirimis

(57) ABSTRACT

A VNLS is described and includes stack recorders for recording data from active data sources comprising at least one topic and having associated therewith a logstream comprising a plurality of active data source data elements; edge recorders for recording data from passive data sources and having associated therewith a second logstream comprising a plurality of passive data source data elements; a staging area for storing the first and second logstreams; and a library for storing snapshots associated with events, wherein the snapshots are created when triggers associated with the events are received at the VNLS and wherein the snapshots include links to a first subset of the plurality of data elements; wherein a second subset of the plurality of data elements that are outside a rolling hold time window and that are not in the first subset of the plurality of data elements are periodically deleted from the VNLS.

16 Claims, 12 Drawing Sheets

(56) References Cited

U.S. PATENT DOCUMENTS

| | | | |
|---|---|---|---|
| 2011/0276396 A1* | 11/2011 | Rathod | G06Q 30/0282 |
| | | | 707/706 |
| 2011/0289263 A1* | 11/2011 | McWilliams | G06F 12/0802 |
| | | | 711/E12.008 |
| 2017/0256023 A1* | 9/2017 | Li | G06F 3/0656 |
| 2018/0217607 A1* | 8/2018 | Ren | G06V 10/40 |
| 2022/0365530 A1* | 11/2022 | Foster | B60W 60/0015 |
| 2022/0396279 A1* | 12/2022 | Chen | B60W 50/0098 |
| 2023/0091772 A1* | 3/2023 | Frye | G01S 7/4013 |
| | | | 701/25 |
| 2024/0004715 A1* | 1/2024 | Bai | G06F 9/5072 |

* cited by examiner

SELECTIVE LOGGING AND WHEEL OF TIME FOR VEHICLE NETWORK LOGGER SYSTEM

BACKGROUND

Technical Field

The present disclosure relates generally to autonomous vehicles (AVs) and, more specifically, to techniques for selective logging of information for a vehicle network logger system (VNLS) in connection with such AVs.

Introduction

An AV is a motorized vehicle that can navigate without a human driver. AVs include computers and control systems that perform driving and navigation tasks that are conventionally performed by a human driver. Such tasks require the collection and processing of large quantities of data using various sensors, including but not limited to, a camera sensor, a light detection and ranging (LIDAR) sensor, and a radio detection and ranging (RADAR) sensor, among others. The sensors collect data and measurements that the AV can use for operations such as navigation. The sensors can provide the data and measurements to an internal computing system of the AV, which can use the data and measurements to control a mechanical system of the AV, such as a vehicle propulsion system, a braking system, or a steering system. Typically, the sensors are mounted at fixed locations on the AVs.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Overview

Figure 1:
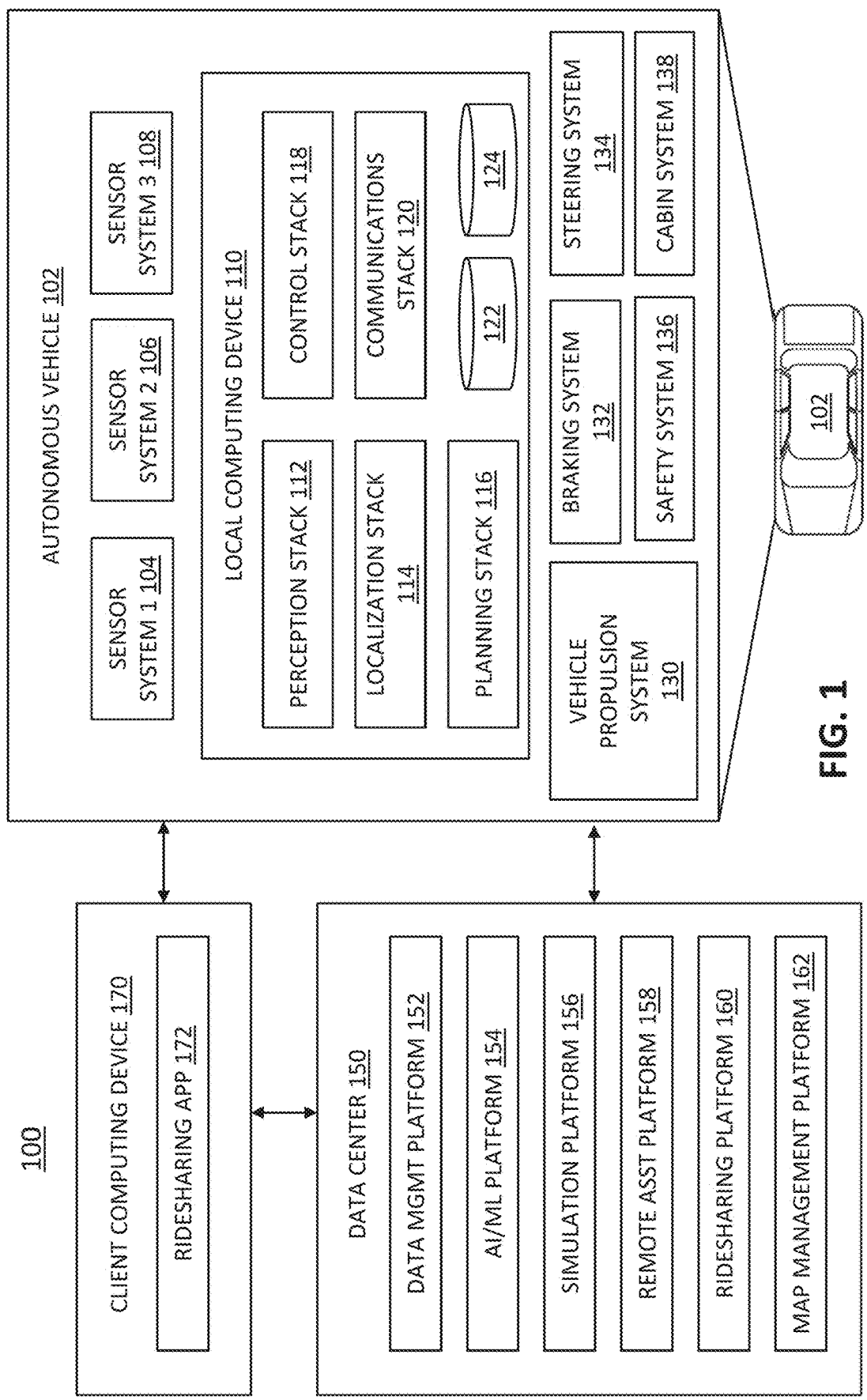
FIG. 1 illustrates an example system environment that can be used to facilitate AV (AV) dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Given the numerous advantages of ride hail, rideshare, and delivery services (hereinafter collectively referred to as rideshare services) provided by AVs, it is anticipated that AV provision of such services will soon become the ubiquitous choice for various user transportation and delivery needs, including but not limited to school commutes, airport transfers, long distance road trips, and grocery and restaurant deliveries, to name a few.

Throughout operation of an AV, various information in connection with the AV is logged by a vehicle network logger system (VNLS). In the context of AVs and as used herein, the term logger refers to an application that stores to persistent media relevant information about various hardware/software devices on AVs (often comprising a fleet of AVs) during operation of the AVs. This data is later uploaded to the cloud for parsing in order to understand what might have happened during a drive and/or recreate a drive in its entirety on equivalent hardware, for example. The saved data may include (1) all input information fed to an AV stack of an AV (for example, all sensor data), (2) the output of any non-deterministic calculations and (3) states of different software modules. The information may be used for a variety of purposes, including debugging of software modules, legal compliance, and performance improvements (especially with regard to the AV stack).

In particular embodiments, AV loggers log all necessary data for the entirety of a drive and store the data to disks, which are then offloaded when the AVs return to the garage. Moreover, as an AV fleet expands, the amount of data logged needs to be reduced to save on onboard hardware costs, offload times, and offload storage costs. Moreover, as sensor traffic between AV automated driving systems computers (ADSCs) and a network switch increases, logging needs to be scaled accordingly.

In accordance with features of embodiments described herein, a VNLS reduces the total size of data logged and stored. There are three locations where such a reduction is beneficial, including on the vehicle (reducing the vehicle disk storage space), during offloading (reducing offload time and bandwidth), and in the cloud (reducing storage costs). There are three ways in which the size of data logged per vehicle may be reduced, including compression, reducing the types of data logged, and reducing the duration of time for which data is logged.

Compression can be applied in all three locations noted above; however, compression alone is not enough to sufficiently reduce the amount of data for purposes described herein. Therefore, the primary focus herein will be on reducing the types of data logged and reducing the duration of time for which data is logged.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 110a-110e), such a collection may be referred to herein without the letters (e.g., as "110").

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example AV Management System

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170, which in some embodiments may comprise an ADSC. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

AV 102 can also include several mechanical systems that can be used to maneuver or operate AV 102. For instance, the mechanical systems can include vehicle propulsion system 130, braking system 132, steering system 134, safety system 136, and cabin system 138, among other systems. Vehicle propulsion system 130 can include an electric motor, an internal combustion engine, or both. The braking system 132 can include an engine brake, a wheel braking system (e.g., a disc braking system that utilizes brake pads), hydraulics, actuators, and/or any other suitable componentry configured to assist in decelerating AV 102. The steering system 134 can include suitable componentry configured to control the direction of movement of the AV 102 during navigation. Safety system 136 can include lights and signal indicators, a parking brake, airbags, and so forth. The cabin system 138 can include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a planning stack 116, a control stack 118, a communications stack 120, a High Definition (HD) geospatial database 122, and an AV operational database 124, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., the data center 150, the client computing device 170, third-party data sources, etc.). The perception stack 112 can detect and classify objects and determine their current and predicted locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth.

Mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 122 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The planning stack 116 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), traffic rules and other safety standards or practices for the road, user input, and other relevant data for directing the AV 102 from one point to another. The planning stack 116 can determine multiple sets of one or more mechanical operations that the AV 102 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 can select from multiple backup plans to carry out. For example, while preparing to change lanes to turn right at an intersection, another vehicle may aggressively cut into the destination lane, making the lane change unsafe. The planning stack 116 could have already determined an alternative plan for such an event, and upon its occurrence, help to direct the AV 102 to go around the block instead of blocking a current lane while waiting for an opening to change lanes.

The control stack 118 can manage the operation of the vehicle propulsion system 130, the braking system 132, the steering system 134, the safety system 136, and the cabin system 138. The control stack 118 can receive sensor signals from the sensor systems 104-108 as well as communicate with other stacks or components of the local computing device 110 or a remote system (e.g., the data center 150) to effectuate operation of the AV 102. For example, the control stack 118 can implement the final path or actions from the multiple paths or actions provided by the planning stack 116. This can involve turning the routes and decisions from the planning stack 116 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 122 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 124 can store raw AV data generated by the sensor systems 104-108 and other components of the AV 102 and/or data received by the AV 102 from remote systems (e.g., the data center 150, the client computing device 170, etc.). In some embodiments, the raw AV data can include HD LIDAR point cloud data, image or video data, RADAR data, GPS data, and other sensor data that the data center 150 can use for creating or updating AV geospatial data as discussed further below with respect to FIG. 5 and elsewhere in the present disclosure.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes one or more of a data management platform 152, an Artificial Intelligence/Machine Learning (AI/ML) platform 154, a simulation platform 156, a remote assistance platform 158, a ridesharing platform 160, and a map management platform 162, among other systems.

Data management platform 152 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to be picked up or dropped off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as tracking specific changes that (human or machine) map editors have made to the data and reverting changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

Example System for Performing Selective Lopping

Figure 2:
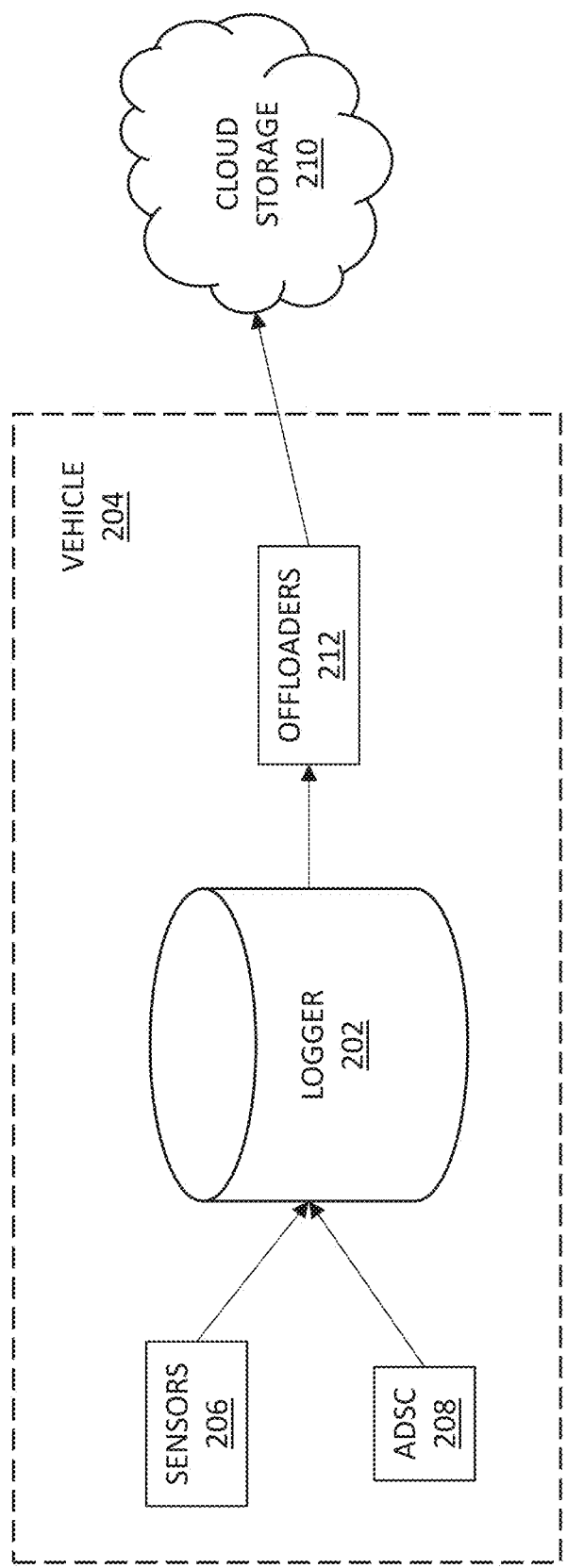
FIG. 2 illustrates a simplified block diagram of a vehicle network logger system (VNLS) according to some aspects of the disclosed technology.

FIG. 2 illustrates a simplified diagram of a system for performing selective logging in a VNLS in accordance with features of particular embodiments. As shown in FIG. 2, system 200 includes a logger 202 installed on a vehicle 204, which may be identical to AV 102 (FIG. 1). Logger 202 receives data from onboard sensors 206 and ADSC 208 and offloads data from the vehicle 204 to cloud storage 210 using offloaders 212, which may include one or more of cellular connections, Wi-Fi connections, and disks. Offloaded data is uploaded from offloaders 210 to cloud storage 212 either manually (e.g., in the case of disks) or automatically (e.g., in the case of cellular and Wi-Fi).

Figure 3:
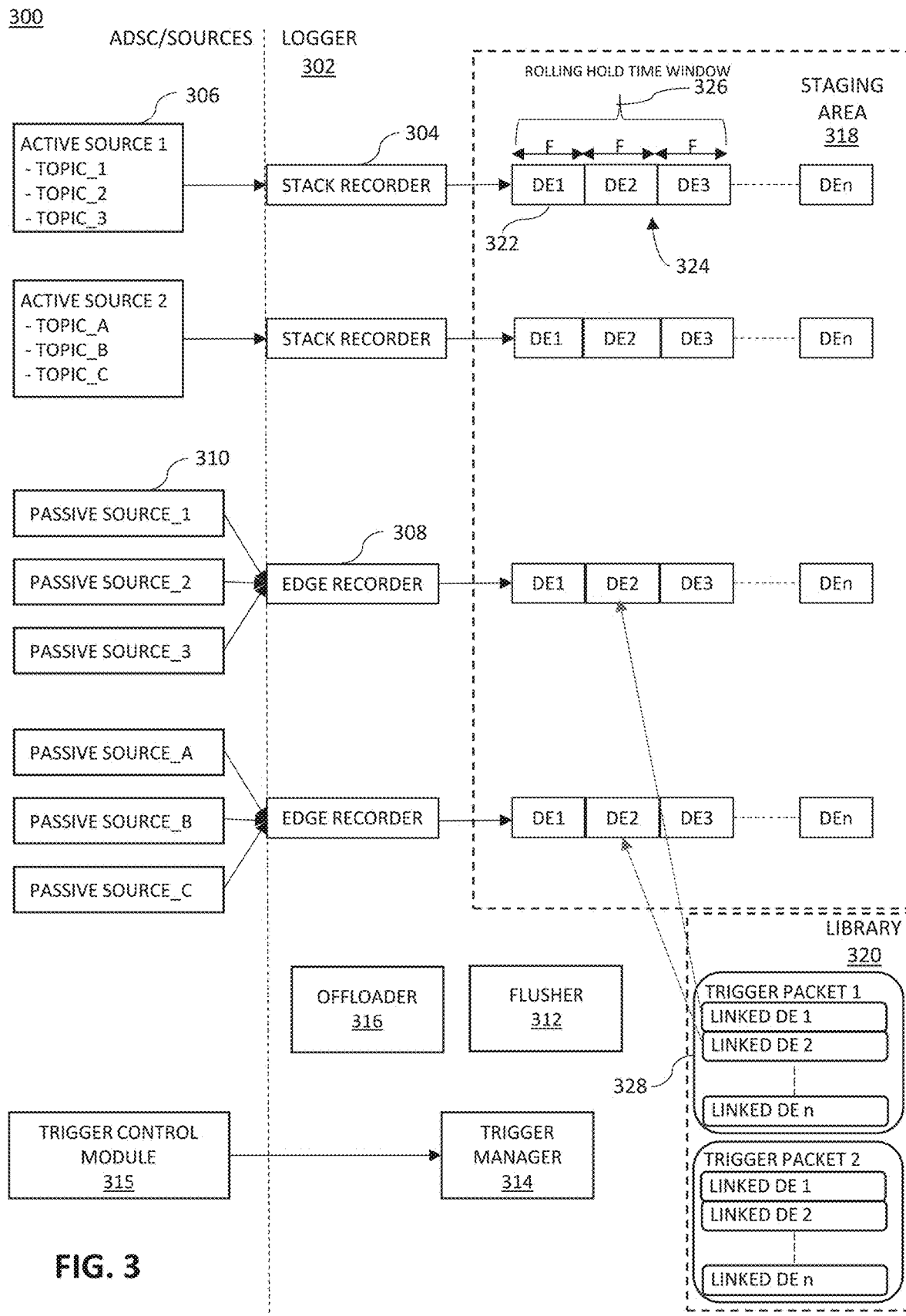
FIG. 3 illustrates a more detailed schematic block diagram of a VNLS according to some aspects of the disclosed technology.

FIG. 3 is a more detailed schematic illustration of a VNLS 300 in accordance with features of embodiments described herein. As shown in FIG. 3, and as noted above, logger 302 includes stack recorders 304 for receiving data from active data sources 306 and edge recorders 308 for receiving data from passive data sources 310. Active data sources, or simply active sources, include sources that are aware of the existence of the logger and package data specifically for processing by the logger. Recorder nodes on the ADSC are examples of active sources. Passive data sources, or simply passive sources, include devices such as sensors that are unaware of the existence of logger 302. Edge recorders 308 listen to the data streams from passive sources 310 and package them accordingly.

In particular embodiments, logger 302 runs four modules, including recorders 304, 306, a flusher 312, a trigger manager 314 (which manages triggers on the logger side in response to triggers from a trigger control module 315 of ADSC), and an offloader 316. Additionally, logger 302 includes data storage generally comprising a staging area 318 and a library 320. Staging area may be implemented using RAM, hybrid RAM, or persistent memory (e.g., a solid-state drive (SSD)). Library may be implemented using SSD. Each recorder 304, 308, is a server that listens to and accepts data to be logged to a corresponding logstream in a single folder. Recorders may be one of two primary types, including stack recorders 304 and edge recorders 308. Stack recorders listen to data from active data sources 306, which sometimes are driver nodes on the ADSC that transmit data from a stack launch to the logger. One stack recorder 304 only listens to data from one active data source 306 and each active data source may include multiple topics. Edge recorders 308 listen to passive data sources 310 and have a bit more responsibility for understanding traits of the passive sources and possibly parsing the data to weed out invalid data. One edge recorder 308 can listen to multiple passive sources 310. Edge recorders 308 can optionally record data from passive sources 310 even when the AV stack is not running by enabling a designated parameter in the edge recorder configuration.

Every active data source 306 can register itself with the logger 302 prior to sending data. When an active data source 306 registers itself, the logger 302 spawns a stack recorder 304 for the active data source. For passive data sources 310, the corresponding edge recorders 308 are created during startup from parsing the relevant configuration files.

Active data sources 306 package data into records, which are transmitted to the logger 302. An active source 306 can begin streaming to an already initialized logger 302 by registering itself as a client. To register itself as a client, the active source 306 needs to specify the set of topics it will transmit. The logger 302 prepares a staging area 318 for the active source 306.

Passive data sources 308 are edge devices. The logger 302 (and more specifically edge recorder 308) is responsible for transforming data from passive sources into a form appropriate for logging. Sensors, such as cameras, LIDARs, and RADARs are examples of passive sources. Data from multiple passive sources 310 is gathered by edge recorders 308 following configuration information provided during initialization. Data from each passive source 310 is labeled under a topic; topic names and passive sources have a one-to-one mapping. Any edge device that meets certain criteria can become a passive source 310 for the logger 302. Such criteria includes having a concept of a payload unit comprising a discrete unit of information with a start, an end, and a single timestamp associated with it (e.g., a jpeg frame, an H.265 P frame or I frame, or a LIDAR point cloud frame). Additionally, for sources for which the edge recorder performs data parsing, frames should arrive with a retrievable time stamp representing frame capture time. Finally, a source address:port should always map to one unique data source.

The staging area 318, or simply staging, is conceptually the primary data holding zone for the logger 302. Two modules modify the contents of the staging area, including the recorders 304, 308, and the flusher 314. As noted above, the role of the recorders 304, 308, is to accept data from various active and passive sources 306, 310, and write data to slices, or data elements, 322 comprising a rolling buffer, alternatively referred to as logstream 324. Each recorder is allocated a single logstream. A slice, or data element, may be a file on persistent media (such as an SSD), a RAM buffer, or a combination of both. The role of the flusher 312 is to delete data elements 322 that are outside of a rolling hold time window 326 and that have not been saved to the library 320. It will be noted that in particular implementations, as described herein, the flusher function 312 is incorporated into the recorders 304, 308.

A logstream, such as logstream 324, is a series of data elements 322 in which each element includes timestamped data received from one or more sources over a fixed time period F. In particular embodiments, each element will not have any data received prior to the timestamp in the name of the element or after the timestamp in the element+F. It will be noted that the creation of the data may have occurred prior to the timestamp, but receipt of the data will not have occurred prior to the timestamp. For example, in the case of camera data, the image might have been captured by the camera prior to the timestamp, but the image would have been received by the logger only after the timestamp.

As an example, if three consecutive files in the logstream for recorder designated "abc" are:
Element P: abc_2021-03-27-23-50-12_1071
Element Q: abc_2021-03-27-23-50-18_1072
Element R: abc_2021-03-27-23-50-23_1073
And the time period F for each file is five seconds, then file P is guaranteed to only have records that were received on or after 2021-03-27-23-50-12 and before 2021-03-27-23-50-17. Similarly, file Q is guaranteed to only contain records received on or after 2021-03-27-23-50-18 and before 2021-03-27-23-50-23. In summary, for any source, the recorder creates a file with the present time in the timestamp, and as data arrives, the recorder appends to the file. After a fixed time period F, the recorder closes the data element and opens a new one with the current timestamp and the process continues. If for the duration of the time period no data is sent by the data source, an empty data element need not be created.

For each recorder, the logger creates a new folder with the recorder name and creates a file named [recordername]_connection_header.xxx with the connection headers of all topics to be expected by that recorder.

Referring again to FIG. 3, the library 320 is a database that holds snapshots, or trigger packets 328, related to the various triggers. A snapshot 328 is created whenever the logger 202 receives an event (e.g., at the trigger manager 314) related to a previously registered trigger. As described in greater detail below, the trigger system, which includes trigger control module 315 and trigger manager 314, generates snapshots 328 to be stored in the library.

The trigger system enables a user to indicate that a certain set of data (i.e., data from a certain set of topics) is of interest and needs to be saved around the time of an incident (referred to as an event). The logger 302 is a client of the trigger system and triggers are registered with the logger for it to map the triggers to its data elements and folders, which mapping is performed by the trigger manager 314. When an event related to a trigger occurs, a notification is sent from the trigger control module 315 to the logger 302 to cause the generation of a snapshot 328 related to the event, as described above.

In certain embodiments, there are three offload methods for data elements: during a drive (which implies that the ADSC is running), when the vehicle is disabled (e.g., post-collision or post-impoundment) and is not expected to be able to get to a fleet operator facility in the near term, and while the vehicle is at a fleet operator facility (which covers all standard data offload, including wired, wireless, or manual).

Table I below indicates a mapping of example trigger priorities to example offload mechanisms.

TABLE I

| PRIORITY | OFFLOAD METHOD | INTENDED USE |
| --- | --- | --- |
| Critical | Cellular, Wi-Fi | Highest priority data needed for legal or regulatory reasons; receives real time cellular data priority and should be limited as it impacts other real time cellular data. |
| RT-Hi | Cellular, Wi-Fi | Real-time high priority data; offloaded after critical (e.g., SCE) events. |
| RT-Med | Cellular, Wi-Fi | Data needed in real time; offloaded after high priority (e.g., TKO) events. |
| RT-Lo | Cellular, Wi-Fi | Data needed in real-time; offloaded last over cellular. |
| Standard | Wi-Fi | Events guaranteed to be recorded; only offloaded over Wi-Fi. |
| Debug | Wi-Fi | Debug and optional topics not guaranteed to be recorded; only offloaded over Wi-Fi. |

Trigger registration can occur at any point during execution of the logger 302. It will be noted that if there are multiple loggers in a vehicle, duplicate versions of the trigger may be registered at each logger with the respective set of topics that each logger will receive. In this situation, a backend server will receive multiple snapshots related to the same event, which will need to be collated. Upon receiving a trigger registration, the logger 302 creates a mapping of the trigger to the logstreams 324 that include data related to the trigger. Note that since logstreams 324 are mapped to data sources 306, 310, that could publish multiple topics, a data element 322 of a logstream 324 might contain multiple topics, of which only a subset pertains to the trigger. This can be addressed during offload and/or by grouping topics appropriately. The sum of lookahead and lookbehind times ($T_w$) forms a rolling hold time window 326 for the trigger. The longest rolling hold time window for all triggers interested in (registered to) a logstream 324 is designated as rolling hold parameter for use by the flusher 312 to delete data elements 322 not referenced by a trigger packet 328.

After a trigger ID has been registered, at any point a client can send a trigger event notification that includes a trigger ID and an event timestamp. Upon receiving an event, the logger 302 creates a snapshot 328 saves it to the library 320. A snapshot is a database entry including a trigger ID, trigger priority, event timestamp, and on-disk data size of the snapshot. The snapshot 328 further includes a list of the following items for each data source:
{datasource_metadata.json file link: {list of data files from that data source}}

Note that each logger on the vehicle that has the trigger ID registered can be provided in the trigger event notification. The data size of the snapshot 328 is used to calculate the approximate impact of the trigger event. Given that there can be multiple events that link to the same data element, it is not guaranteed that removal of a snapshot will decrease the disk usage by that amount.

Example Techniques for Performing Selective Logging

Figure 4:
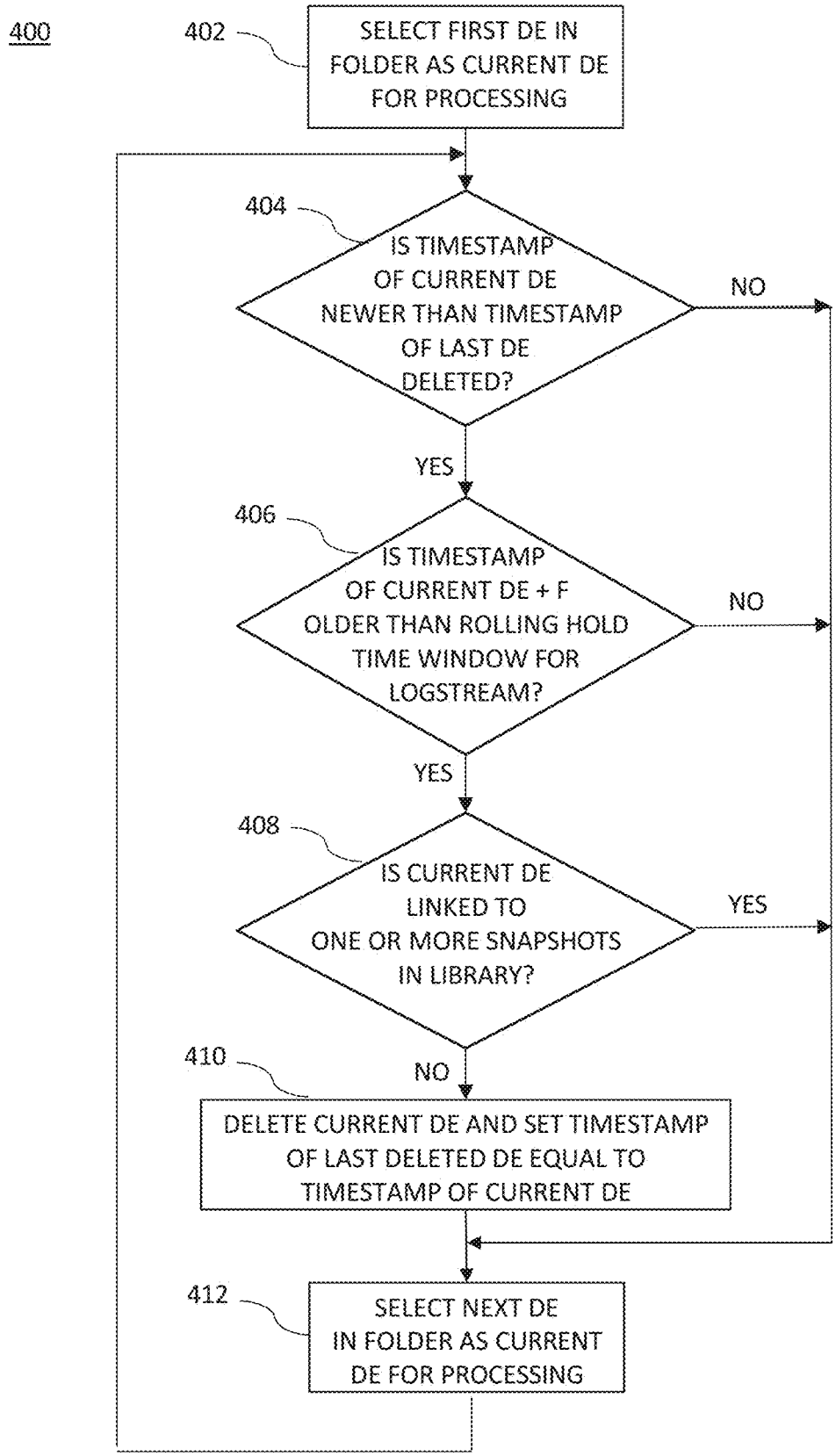
FIG. 4 illustrates a flow diagram of example operations for performing selective logging in connection with a VNLS according to some aspects of the disclosed technology.

Every logstream 324 has a folder allocated to it. The flusher 312 executes periodically (e.g., at most, every F seconds) with respect to each folder/logstream. FIG. 4 is a flowchart 400 illustrating example operations performed by the flusher 312 with respect to each folder each time it executes. In certain embodiments, one or more of the operations illustrated in FIG. 4 may be executed by one or more of the elements shown in FIGS. 1 and/or 2.

In 402, the first data element in the folder is selected as the current data element (DE) for processing.

In 404, a determination is made whether the timestamp in the filename of the current data element is newer than the timestamp in the filename of the data element last deleted by the flusher. If a positive determination is made in 404, execution proceeds to 406.

In 406, a determination is made whether the timestamp in the filename of the current data element plus F is older than the rolling hold time window for the logstream. If a positive determination is made in 406, execution proceeds to 408.

In 408, a determination is made whether the current data element is linked to one or more snapshots in the library. If a negative determination is made in 408, execution proceeds to 410.

In 410, the current data element is deleted from the database (e.g., staging area) and the timestamp of in the filename of the data element last deleted by the flusher is updated to the timestamp in the filename of the current data element.

In 412, the next data element in the folder is selected as the current data element to be processed and execution returns to 402.

If a negative determination is made in either 404 or 406 or a positive determination is made in 408, execution proceeds directly to 412.

Although the operations of the example method shown in and described with reference to FIG. 4 are illustrated as occurring once each and in a particular order, it will be recognized that the operations may be performed in any suitable order and repeated as desired. Additionally, one or more operations may be performed in parallel. Furthermore, the operations illustrated in FIG. 4 may be combined or may include more or fewer details than described.

A data element is linked to by a snapshot in the library when an event has occurred for one or more triggers that are interested in that logstream where rolling hold time window of the trigger overlaps with the rolling hold time window of the data element and the snapshot has not yet been offloaded (or if the trigger has a preserve_post_offload flag set).

A data element can be linked to multiple times (e.g., by multiples snapshots) for various reasons. For example, different triggers that are interested in the same logstream have events within each other's rolling hold time window and/or two events occurred for the same trigger whose rolling hold time windows overlap. All links to a data element by snapshots in the library should be deleted before the data element can become a candidate for deletion. Additionally, except in a standalone mode, in cases in which the ADSC stops functioning for any reason, the flusher may cease deleting data elements to ensure that crucial data, such as collision-related data, does not get erased in case of an incident that destroys the ADSC but not the associated logger.

Data offload is the process of moving logged data off of the disk drives comprising the library to cloud storage, for example. In particular embodiments, and referring again to FIG. 3, the offloader 316, or offload module, provides an API to the external world to offload saved event snapshots. The offload module may operate regardless of whether the ADSC is active or whether a stack launch is operational. The offload module will have the capability to offload data elements related to multiple launches, so it is not necessary to have completed offload of a particular launch's data before starting the next one.

In particular embodiments, every data element is currently required to have connection headers that provide details for a topic prior to the topic message itself appearing in the data element. Given the sheer number of small data elements deployed in connection with VNLS embodiments described herein, writing this metadata to every data element may prove inefficient, in which case the connection headers may be stored in a data element stored within the folder for each data source.

As previously noted, a vehicle may have multiple ADSCs and multiple loggers. When registering triggers and sending events, the same trigger might have to be sent to multiple loggers, since topics of interest might span multiple loggers; therefore, the same evet snapshot might span loggers and since data offloads happen per event snapshot, the same snapshot ID can be offloaded from multiple loggers. This means that on the backend, multiple snapshots with the same ID and timestamp can exist. Backend processing algorithms should be made aware of and address this phenomenon.

Example Considerations for Grouping of Topics

It will be recognized that there are two parameters that influence the total number of data elements on disk and their relative sizes, including the length of recorder time period F and the grouping of topics to logstreams.

With regard to the length of recorder time period F, it is clear that a larger value for F results in fewer larger data elements and vice versa, a smaller value for F results in fewer smaller data elements. The value of F also impacts how much extra data gets logged over and above any time window for any logstream; that is, since the smallest unit of data that gets saved to the library is a data element, the time window of a data element represents the granularity of data saved. In view of the foregoing, F needs to be set to a percentage of the smallest time window with appropriate minimum and maximums. In a particular embodiment, F may be set to five seconds.

Figure 5A:
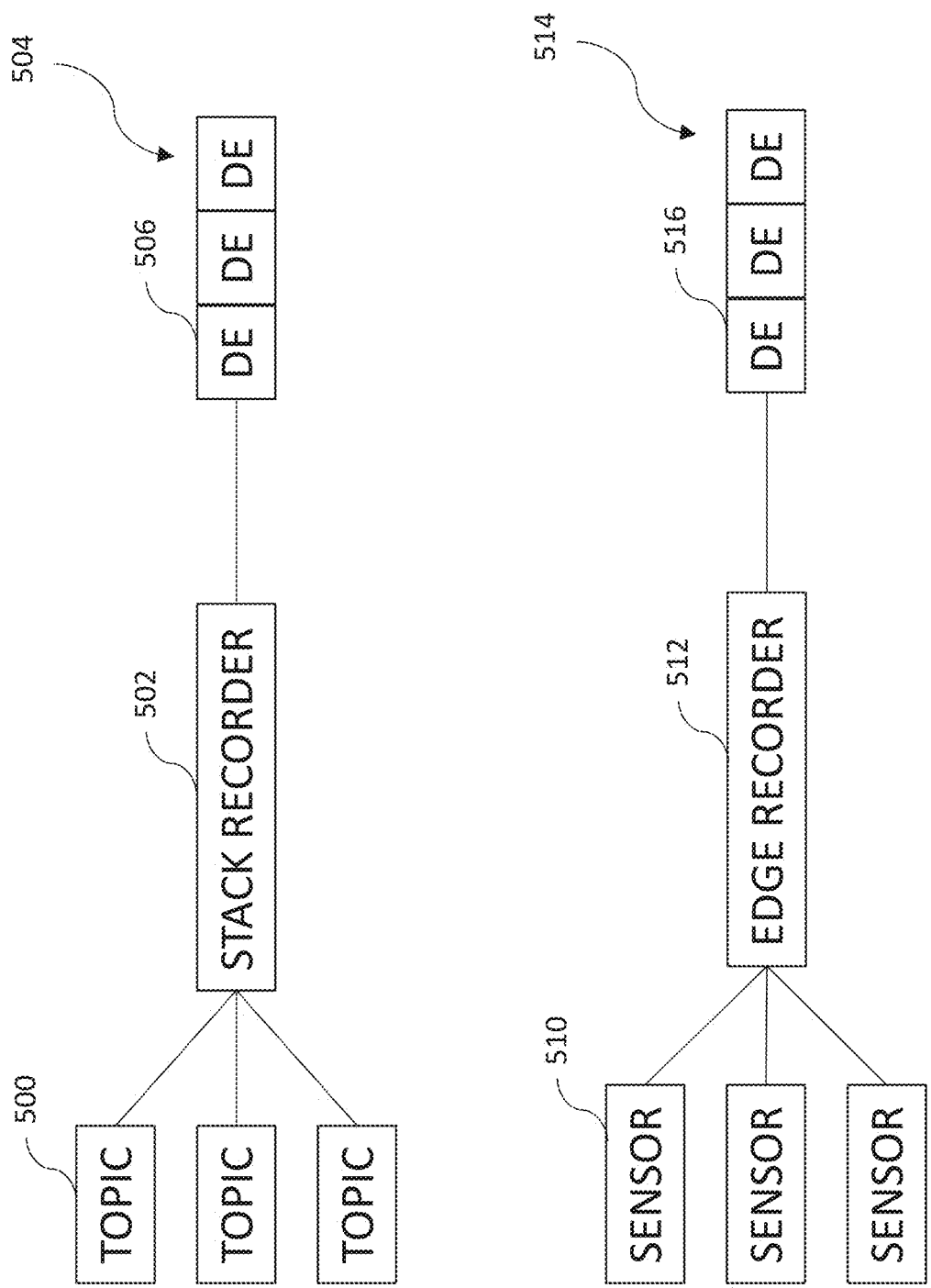
FIGS. 5A and 5B illustrate grouping of topics to recorders of a VNLS according to some aspects of the disclosed technology.

Referring to FIG. 5A, with regard to grouping of topics to logstreams, as has been discussed above, for data from the ADSC(s), a set of topics 500 are grouped by an active data source and sent to a stack recorder 502, which creates a logstream 504 of data elements 506 for the set of topics. For sensor traffic, a set of sensors 510 are grouped together by an edge recorder 512, which creates a logstream 514 of data elements 516 for the set of sensors. These groupings are important; when a trigger event occurs, links to a set of data elements are saved to the library as snapshots. If a trigger is only interested in a subset of the topics in a data element, the remaining topics are saved unnecessarily, resulting in a storage size bloat and an offload size bloat.

Figure 5B:
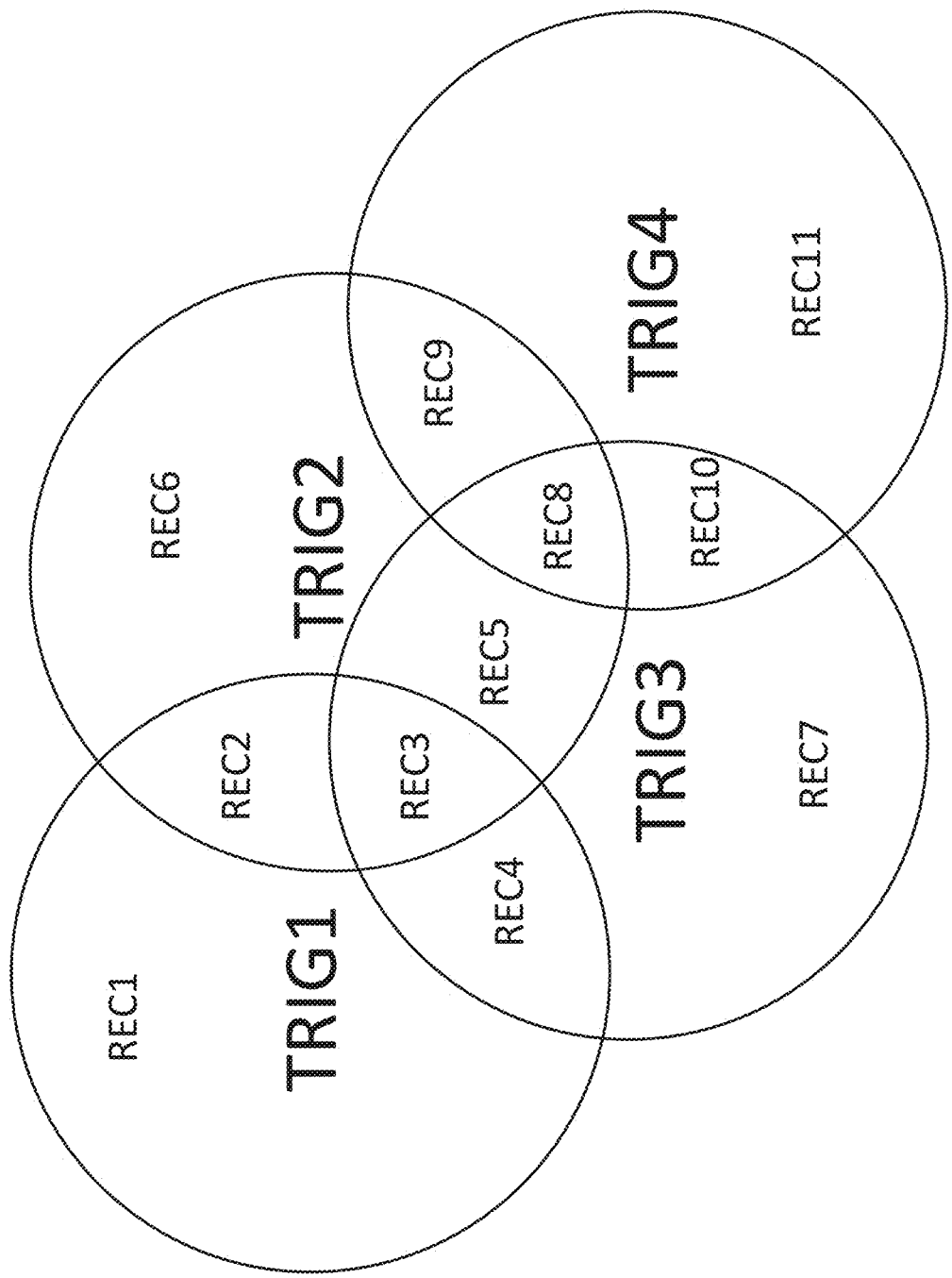

One solution to this is to split each topic into its own logstream (i.e., one recorder per topic), thereby creating a lot of small data elements. This has two downsides. In particular, more data elements imply larger data structures to be maintained to track them. Additionally, write performance for disks are better when large block sizes are sent. Therefore, it makes sense to reduce the total data element count in the system. Since every event snapshot saves data elements from various recorders, the ideal grouping of topics to a recorder is simply to have each grouping represent a unique intersection of all of the triggers that are interested in the topic. This concept is illustrated in FIG. 5B, where 11 recorders REC1-REC11 are provided for the four triggers (TRIG1-TRIG4) where each set represents the set of topics subscribed to by the corresponding one of four triggers (TRIG1-TRIG4).

In situations in which a vehicle has multiple loggers, the data sources normally direct data toward one or the other logger; however, for certain topics (e.g., topics with legal and/or safety implications) it is possible for the sources to send the same data to more than one logger. Deduplication of this data needs to be handled on the backend. Additionally, loggers are designed such that logged data Is written only once to the disk per logger. If there are multiple triggers that require the same set of data, the triggers (stored in the library) sill simply link to the same set of data elements. Data elements are offloaded only once. Again, the backend will need to link data elements to trigger events. To facilitate this process, along with the data elements, event details may also be uploaded to enable the backend to recreate the trigger snapshots.

Example Data Structures for Implementation in VNLS

In particular embodiments, recorders may be used to implement two types of selective logging operations in a VNLS. For RAM-based selective logging operations, recorders should support F-second data elements and a rolling buffer stored in RAM until a snapshot arrives, unless there is a legal mandate to always flush or continuous recording is being performed. For disk-based selective logging operations, recorders should support F-second data elements and a rolling buffer stored to disk.

Two data structures may be provided to hold the data, including a memory pool of page buffers having a defined size (e.g., 64 KB) for holding data (in particular embodiments, records can span multiple pages), and a rolling buffer in RAM that points to the most recent rolling time window of data, either in RAM or disk.

In particular embodiments, each recorder has three parts: a cacher, a parser, and a flusher. The cacher receives data from the network and caches it in a ledger of the page buffer. Each recorder may have more than one cacher (e.g., where multiple sensors are to be written to a single data element). The parser acts on the page buffers of all cachers to parse and delete unused pages or data elements. The parser also sets save flags in case of event snapshots. Each recorder has one flusher, which reads the page buffer and flushes pages that are flagged to be saved to disk.

Figure 6A:
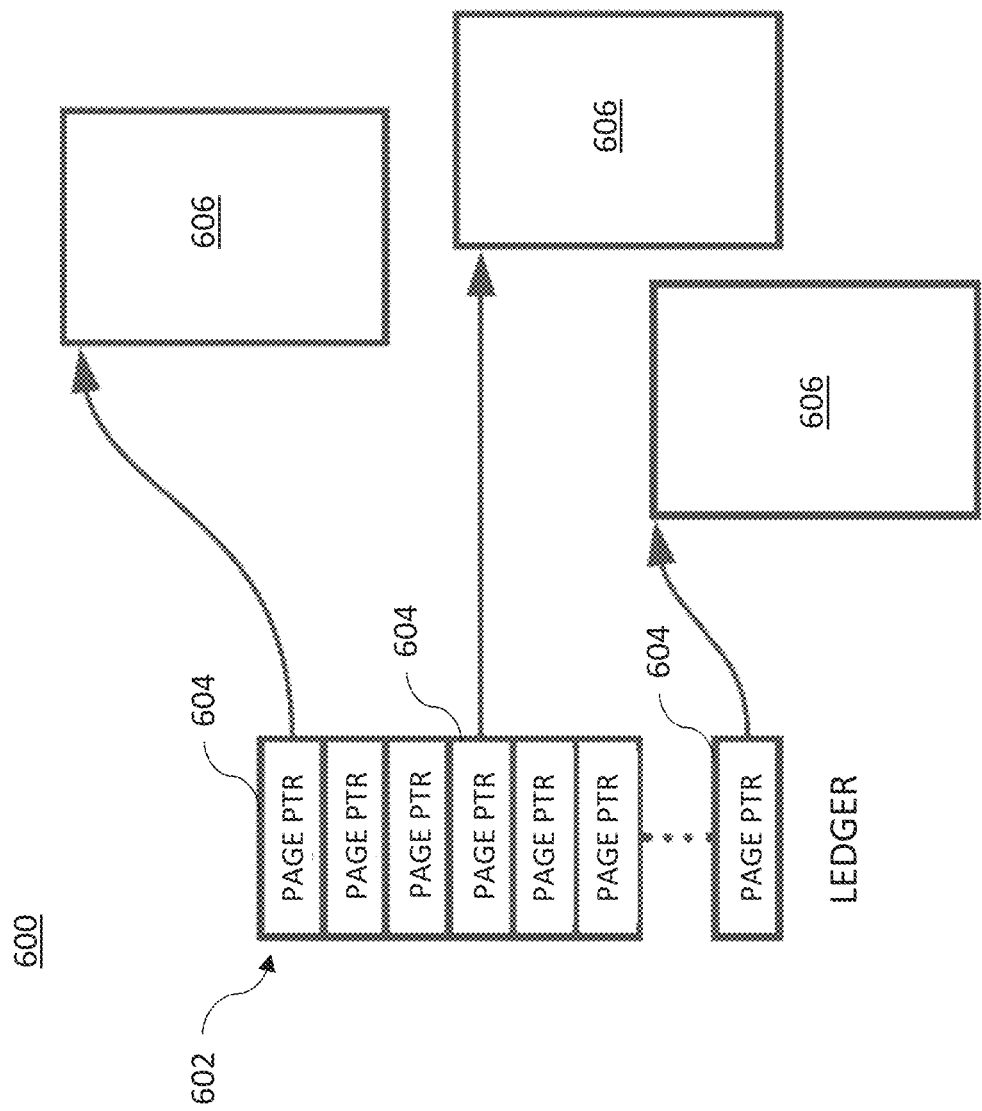
FIGS. 6A and 6B illustrate data structures for use by a VNLS according to some aspects of the disclosed technology.

FIG. 6A illustrates a memory page buffer pool 600 including a ledger 602 comprising ledger entries 604 that point to pages 606. Each page 606 may hold a series of bao records. In particular embodiments, the ledger 602 may be a vector of 128 KB entries, each of which may point to 64 KB of data; accordingly, the total data that can be held is 8 GB, which is estimated to be sufficient to accommodate 40 seconds worth of rolling buffer for one recorder reader of up to 200 MB/s data rate.

Figure 6B:
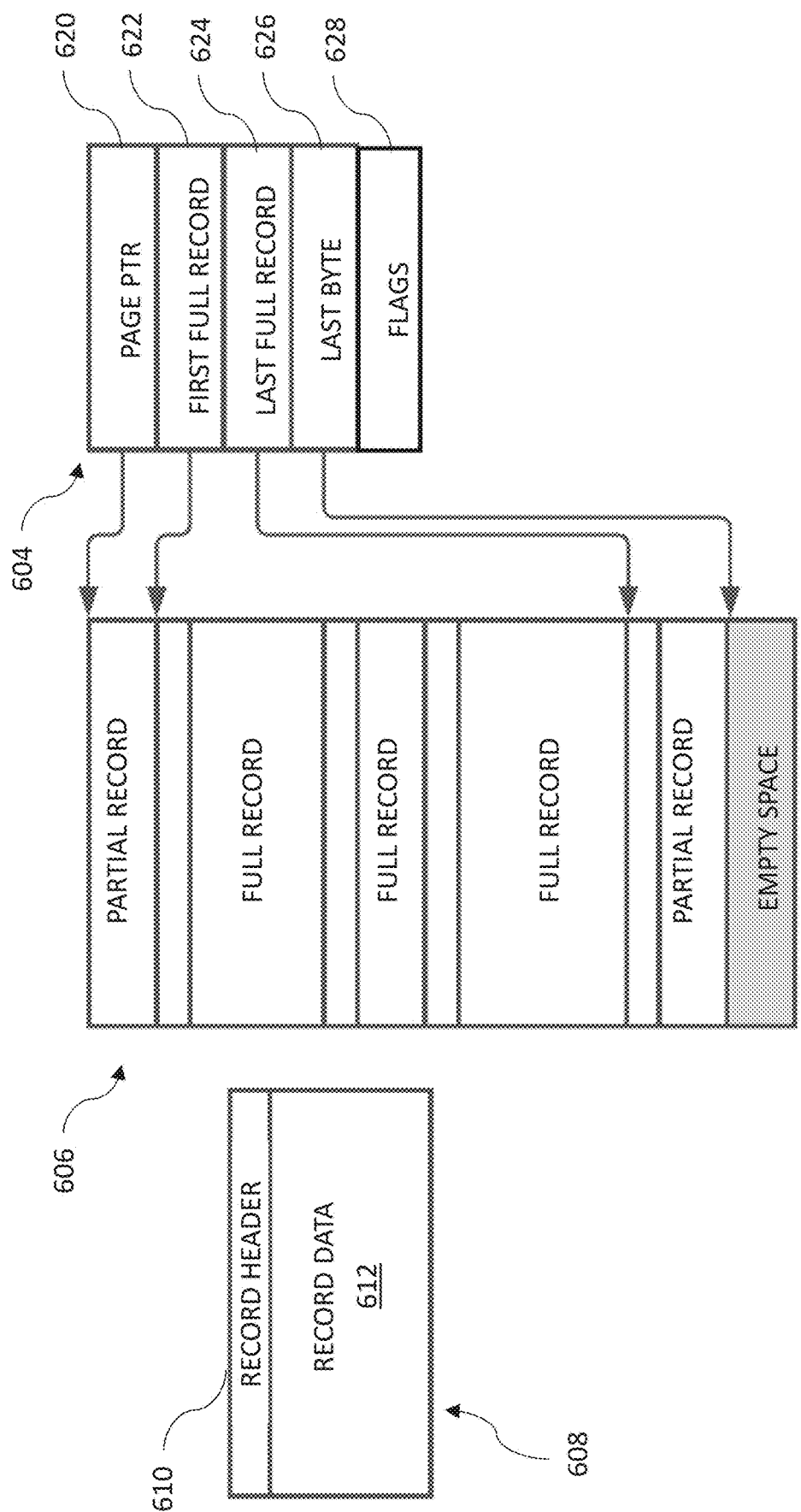

Referring now also to FIG. 6B, a record 608 may include a record header 610 and data 612. Each ledger entry 604 is a data structure that may hold one or more entries including of a pointer to the corresponding page 606 (entry 620), an offset of the start of the first full record (entry 622), an offset of the end of the last full record (entry 624) an offset of the last byte written to the page (entry 626), and flags (e.g., flushed, first segment, last segment, frame boundary) (entry 628). The pointer can be a null pointer if the corresponding page has been flushed.

Example Operation of Rolling Buffer Index for VNLS

In accordance with features of embodiments described herein, a rolling buffer index, or "wheel of time," is provided for recorders implementing selective logging. The rolling buffer index include a one-time allocated vector of T elements, each of which corresponds to an F-second interval. Accordingly, if the rolling hold time window is R seconds:

$$T=((R+F-1)/F)+N$$

where N represents extra elements necessary to store overflow data.

Each element has five fields, including a composite pointer to the first byte in a time slice (comprising a RAM pointer to an entry in the ledger and an offset to the start of the first record within the page pointed to by the ledger entry), a composite pointer to the first by the of the next time slice (NULL indicates the current data still belongs to this slice), a composite pointer to the next unflushed byte, the filename of the data element created if there is a disk version and flags (e.g., flush_slice, save_slice).

A composite pointer, or c-pointer, is a pair of two values, including a pointer to an entry in the ledger, which can simply be an index into the ledger, and byte offset to where the first record starts within the indicated ledger entry. If the time slice contains no data, the first byte pointer will be NULL. When all of the data has been flushed to disk, the next byte pointer will be equal to the next time slice pointer.

Figure 7:
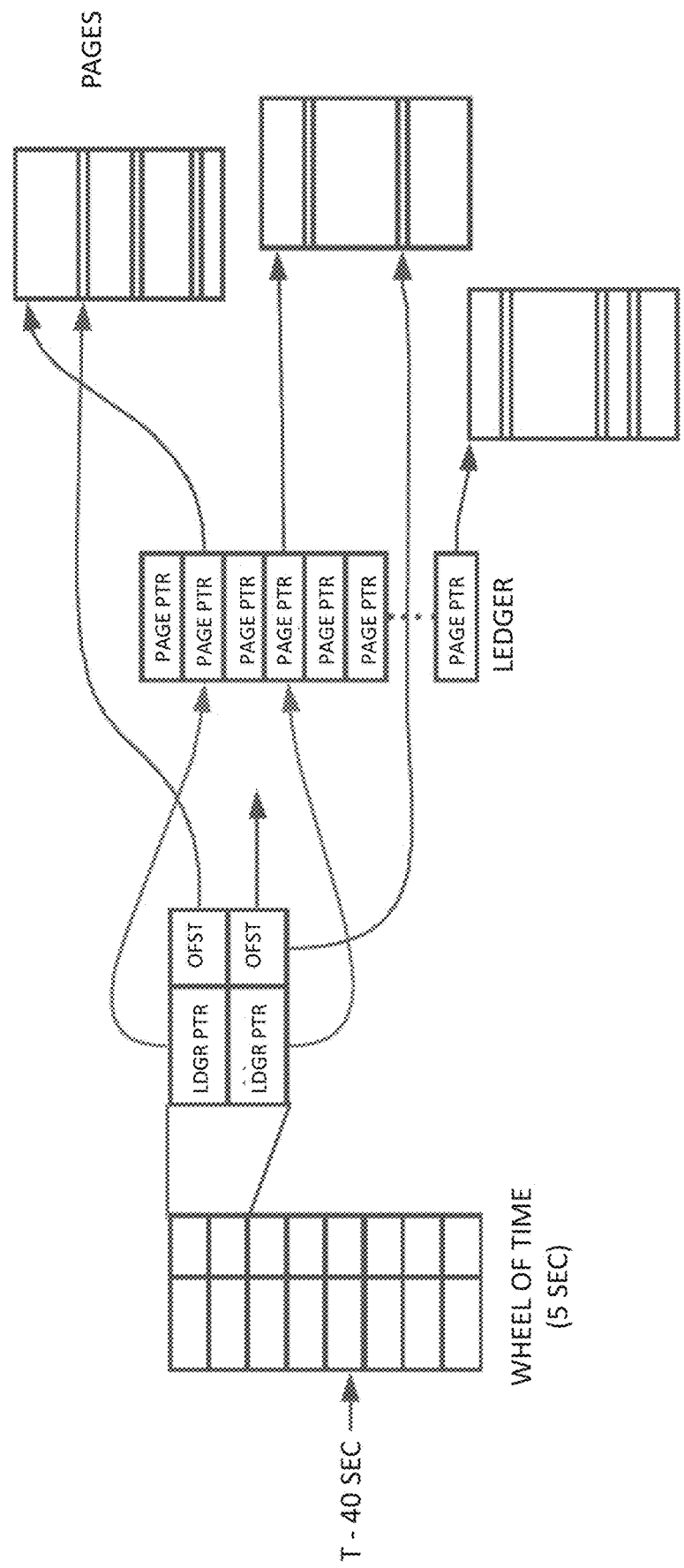
FIG. 7 illustrates an example of a wheel of time for implementation in a VNLS, according to some aspects of the disclosed technology.

FIG. 7 illustrates an example of a 40 second wheel of time showing only the first byte RAM pointers and offsets. The wheel of time points to the ledger instead of the page itself to aid in clearing out ledger entries once they have been flushed. The ledger is implemented as a circular vector of pointers; therefore, the pages can be read in sequence until the beginning of the next F-second interval. In accordance with features of embodiments described herein, a frame is assigned to a slice if it starts in a slice. In alternative embodiments, a frame is assigned to a slice if it ends in a slice.

Figure 8A:
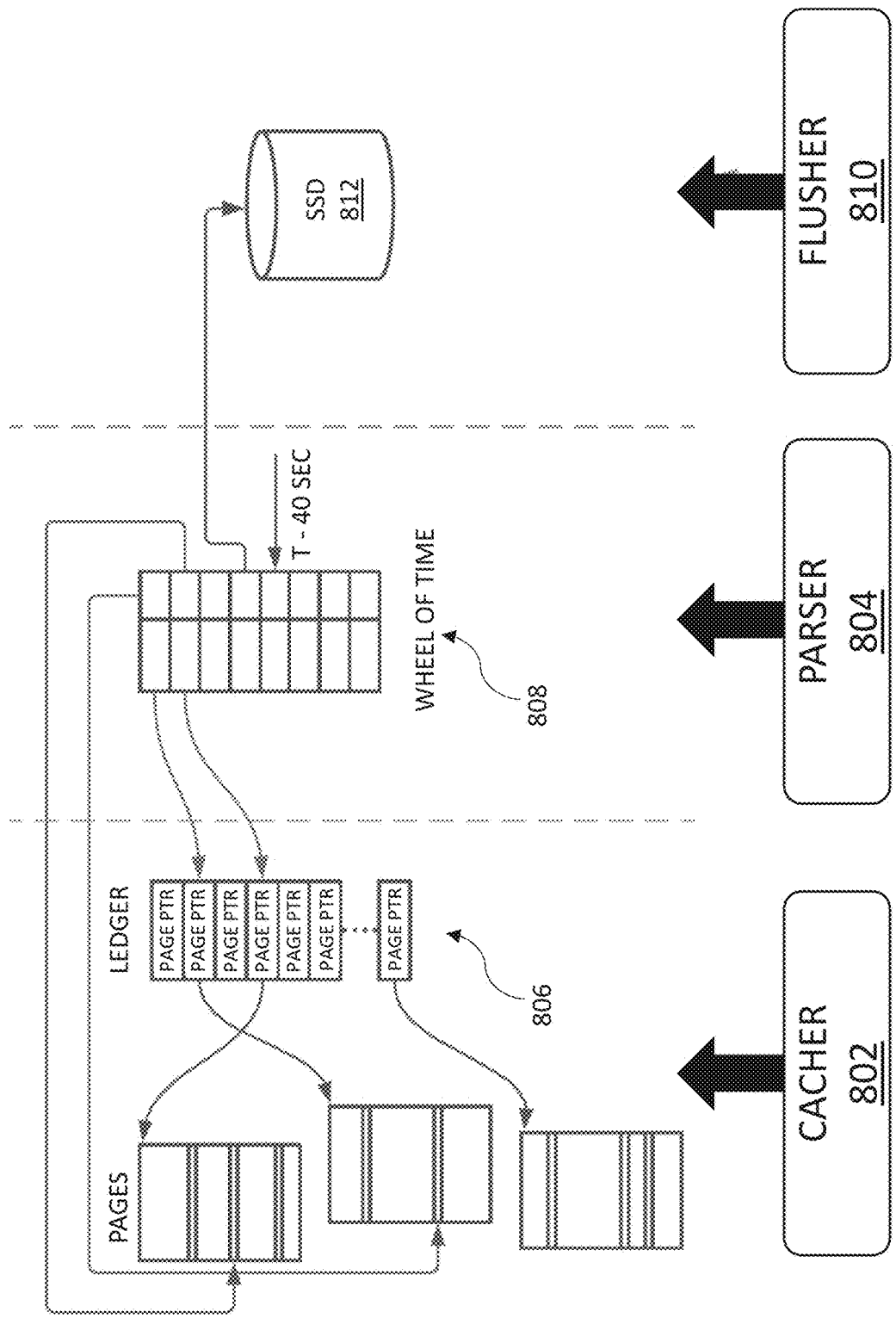
FIGS. 8A and 8B illustrate a dataflow of a VNLS including a wheel of time according to some aspects of the disclosed technology.

FIG. 8A illustrates a VNLS data flow 800 in accordance with particular embodiments. As shown in FIG. 8A, a cacher 802 executes periodically (e.g., every 100 ms) and is responsible for copying data from the socket into the memory page buffer. The cacher 802 updates the writeOffset counter of the ledger entry as it writes data into the memory page buffer. The cacher 802 may have two threads, including a receiver and a sender. The receiver thread receives data from the socket and populates it into the ledger. The sender thread sends a handshake message back to the client.

Figure 8B:
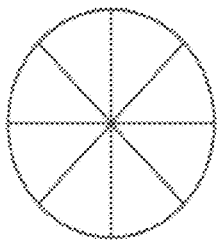
Figure 8B:
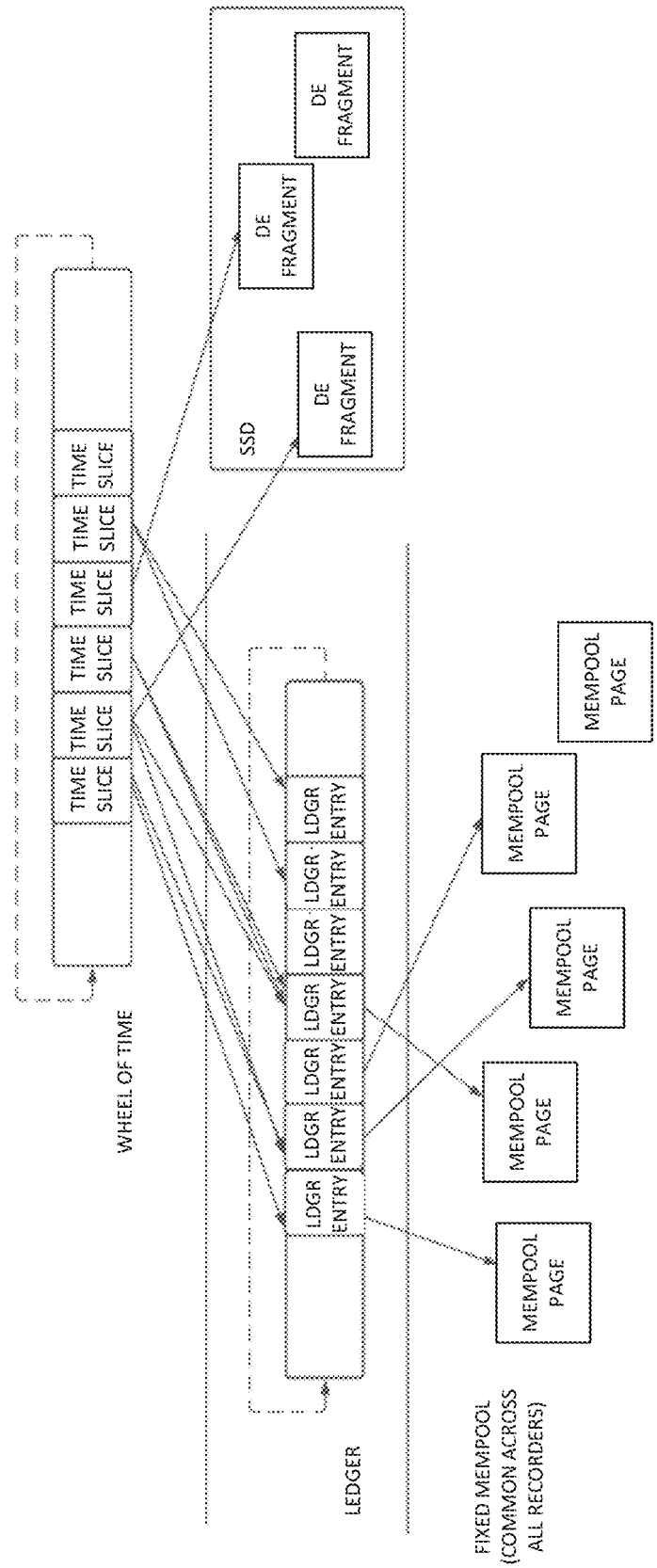

A parser 804 parses the received records stored in the ledger and annotates the ledger 806 and the wheel of time 808 accordingly. In particular embodiments, the parser 804 may be run as part of the receiver thread of the cacher 802. In the receiver thread, to update ledger entries, each record header should be parsed. If a connection header is found during parsing, the connection header may be written to a metadata.json file and data is moved up to make it contiguous. The parser 804 also operates the wheel of time 808, a more detailed illustration of which is provided in FIG. 8B. In accordance with features of embodiments described herein, every F seconds, the wheel of time frees the oldest time entry and corresponding page buffers then it repurposes the resources the newest entry, which is simply a pointer to the earliest record in the latest F-second interval (i.e., the current time modulo F). Freeing the oldest entry includes two items. First, if the entry has page buffers, the buffers are freed. Second, if a save_slice flag is set, either an error is thrown, because the slice should have been saved previously, or the slice is saved at that time. If the entry has an associated data element, the data element is deleted unless the save_slice flag is set. A new entry is then created. The creation of a new entry includes two items. First, the flush_slice and save_slice flags are to the values of always_flush and always_save, respectively (and if the flush_slice flag is TRUE, the data_to_be_flushed flag is set for the writer. Second, the pointers are updated.

A Save Data event may be sent by the trigger manager upon receiving an event snapshot. In a multiple of F seconds, this event results in the flush_slice and save_slice flags of the corresponding wheel of time entries being set and in the data_to_be_flushed flag being set for the writer. Optionally, if the global memory pool reports the number of free pages is running low, then the flush_slice flag can only be set for the newest wheel of time entry. This has the additional bonus of storing just that time slice on disk instead of RAM.

Referring again to FIG. 8A, a flusher 810 runs periodically (e.g., every 50 ms) to flush data to a disk 812 across multiple page buffers. If the wheel of time exists and either a data_to_be_flushed flag or always_flush flag is TRUE, the wheel of time is parsed as follows. Starting with the oldest interval to be flushed, data is written up to the lowest of (one full interval, the present time). Next, the writer maintains the offset of bytes written to and opens filename. As writes happen, pages can be purged, with the exception of the first and last pages. In particular, if the process does not start from byte 0, the writer does not know if the previous bytes have been written. In this case, it is the responsibility of the writer caller to ensure that the page gets deleted. There are two times to check this: (1) when a partial page write begins, at which point the previous wheel of time slice should be read to see if it has been flushed; and (2) when a slice flush is completing, at which point the next wheel of time slice should be read to see if the rest of the page has been flushed previously.

Example Processor-Based System

Figure 9:
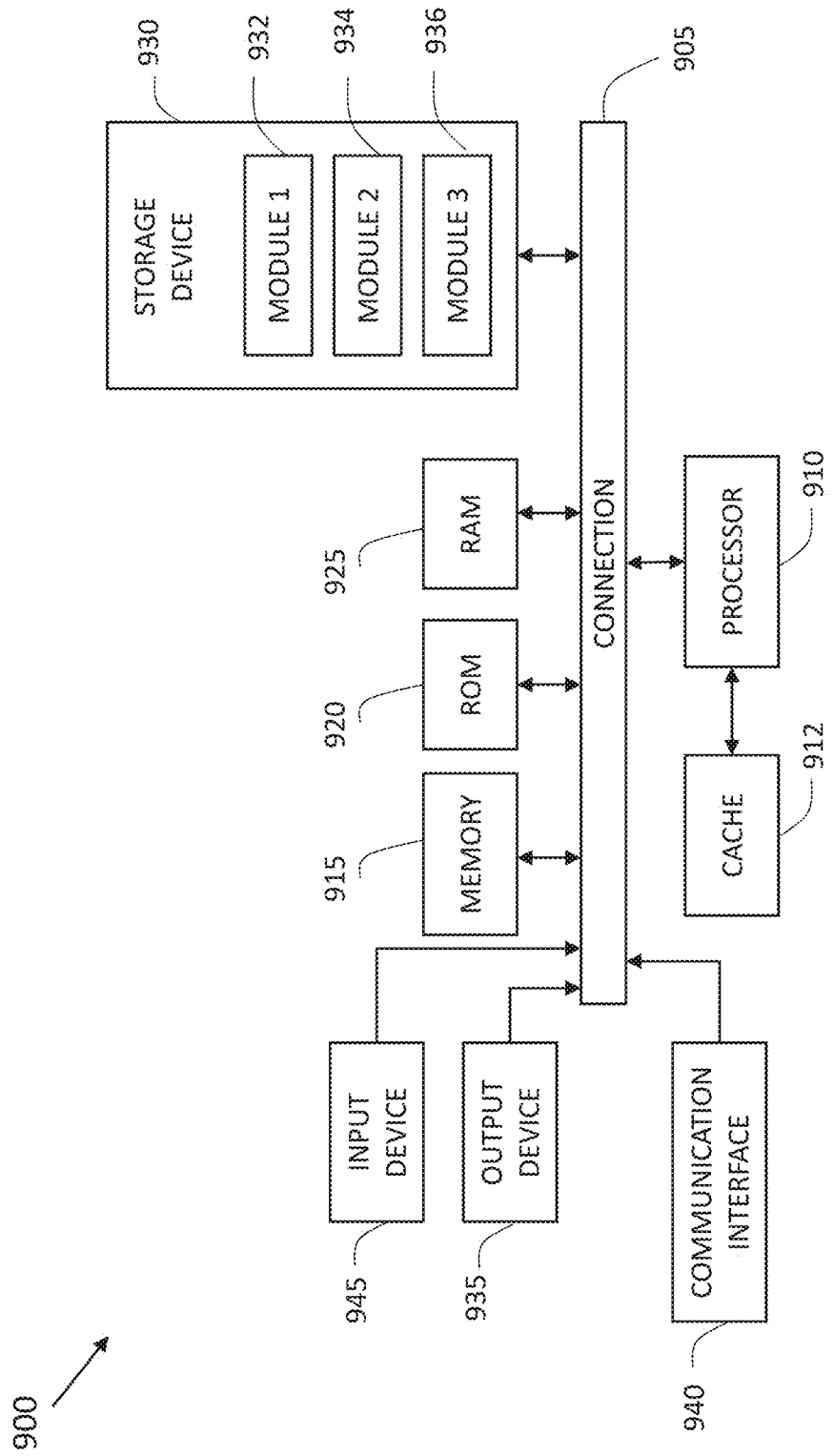
FIG. 9 illustrates an example processor-based system with which some aspects of the disclosed technology can be implemented.

FIG. 9 illustrates an example processor-based system with which some aspects of the subject technology can be implemented. For example, processor-based system 900 can be any computing device making up, or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (Central Processing Unit (CPU) or processor) 910 and connection 905 that couples various system components including system memory 915, such as Read-Only Memory (ROM) 920 and Random-Access Memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a Bluetooth® wireless signal transfer, a Bluetooth® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, WLAN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 940 may also include one or more GNSS receivers or transceivers that are used to determine a location of the computing system 900 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer-readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid state memory, a Compact Disc Read-Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random- Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 930 can include software services, servers, services, etc., that when the code that defines such software is executed by the processor 910, it causes the system 900 to perform a function. In some embodiments, a hardware service that performs a particular function can include the software component stored in a computer-readable medium in connection with the necessary hardware components, such as processor 910, connection 905, output device 935, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network personal computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 provides a vehicle network logging system (VNLS) comprising stack recorders for recording data from active data sources, the active data source data comprising at least one topic, each of the stack recorders having associated therewith a first logstream comprising a plurality of data elements comprising the active data source data; edge recorders for recording data from passive data sources, each of the edge recorders having associated therewith a second logstream comprising a plurality of data elements comprising the passive data source data; a staging area for storing the first and second logstreams; and a library for storing snapshots associated with events, wherein the snapshots are created when triggers associated with the events are received at the VNLS and wherein the snapshots include links to a first subset of the plurality of data elements; wherein a second subset of the plurality of data elements that are outside a rolling hold time window and that are not in the first subset of the plurality of data elements are periodically deleted from the VNLS.

Example 2 provides the VNLS of example 1, wherein the first subset of the plurality of data elements are offloaded to cloud storage.

Example 3 provides the VNLS of example 1, further comprising a flusher for deleting the second subset of data elements from the VNLS data elements.

Example 4 provides the VNLS of example 1, wherein each of the snapshots further comprise an ID of a trigger associated with the snapshot, a priority of the trigger associated with the snapshot, a timestamp of the event associated with the snapshot, and a data size of the snapshot.

Example 5 provides the VNLS of example 1, wherein each of the edge recorders record data from a plurality of passive data sources.

Example 6 provides the VNLS of example 1, wherein the passive data sources comprise onboard sensors of a vehicle.

Example 7 provides the VNLS of example 1, wherein each of the active data sources comprise a plurality of topics.

Example 8 provides the VNLS of example 1, wherein the active data source packages data into a form parseable by the VNLS.

Example 9 provides the VNLS of example 1, wherein each data element of the plurality of data elements stores timestamped data received from at least one of the sources over a fixed time period F.

Example 10 provides the VNLS of example 1, wherein each of the logstreams has associated therewith a rolling hold time window.

Example 11 provides a method for performing selective logging in a vehicle network logging system (VNLS), the method comprising recording data from data sources; generating from the recorded data data elements comprising a logstream, wherein each of the data elements comprises an F-second interval of the recorded data and includes a timestamp indicative of a beginning time of the interval; generating a snapshot in connection with a trigger received from a trigger manager, wherein the snapshot links to a first subset of the data elements containing data related to an event associated with the trigger; periodically deleting a second subset of the data elements comprising ones of the data elements that are outside a rolling hold time window associated with the logstream and that are not part of the first subset of the data elements.

Example 12 provides the method of example 11, further comprising storing the first subset of the data elements for subsequent offloading.

Example 13 provides the method of example 12, wherein the first subset of the data elements are stored on a solid-state drive.

Example 14 provides the method of example 11, wherein the snapshot comprises one or more of an ID of the trigger associated with the snapshot, a priority of the trigger associated with the snapshot, a timestamp of the event associated with the snapshot, and a data size of the snapshot.

Example 15 provides the method of example 11, wherein the sources comprise at least one of an automated driving system computer (ADSC) of a vehicle and onboard sensors of the vehicle.

Example 16 provides a vehicle network logging system (VNLS) comprising a cacher for copying data from a data source to a memory page buffer and updating entries of a ledger; a parser for parsing the entries of the ledger and updating the ledger entries and entries of a rolling buffer index, wherein each of the entries of the ledger is associated with an F-seconds long time slice of the data; and a flusher for periodically flushing data from the memory page buffer to a disk in accordance with the rolling buffer index, wherein the flusher parses the rolling buffer index starting with the oldest time slice to be flushed; and wherein the parser frees the oldest entry in the rolling buffer index and a page buffers corresponding to the oldest entry in the rolling buffer index every F seconds and adds a new entry to the rolling buffer index.

Example 17 provides the VNLS of example 16, wherein upon receipt of a trigger in connection with one of the time slices, setting a flag in connection with the one of the time slices.

Example 18 provides the VNLS of example 16, wherein the disk comprises a solid state drive.

Example 19 provides the VNLS of example 16, wherein each of the entries of the rolling buffer index includes a composite pointer.

Example 20 provides the VNLS of example 19, wherein the composite pointer comprises a pointer to an entry in the ledger and an offset to where a first record starts within a page pointed to by the entry in the ledger.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the interior electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as exterior storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples. The specifications apply only to one non-limiting example and, accordingly, they should be construed as such. In the foregoing description, example embodiments have been described with reference to particular arrangements of components. Various modifications and changes may be made to such embodiments without departing from the scope of the appended examples. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended examples. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the examples appended hereto, Applicant wishes to note that the Applicant: (a) does not intend any of the appended examples to invoke paragraph (f) of 35 U.S.C. Section 112 as it exists on the date of the filing hereof unless the words "means for" or "step for" are specifically used in the particular examples; and (b) does not intend, by any statement in the Specification, to limit this disclosure in any way that is not otherwise reflected in the appended examples.

What is claimed is:

1. A vehicle network logging system (VNLS) comprising:
   stack recorders for recording active data from active data sources, the recorded active data comprising at least one topic, wherein each of the stack recorders is associated with a logstream from a first set of logstreams comprising a plurality of data elements comprising the active data;
   edge recorders for recording passive data from passive data sources, wherein each of the edge recorders is associated with a logstream from a second set of logstreams comprising a plurality of data elements comprising the passive data;
   a staging area for storing the first and second logstreams; and
   a library for storing snapshots associated with events, wherein the snapshots are created when triggers associated with the events are received at the VNLS and wherein the snapshots include links to a first subset of the plurality of data elements;
   wherein a second subset of the plurality of data elements that are outside a rolling hold time window and that are not in the first subset of the plurality of data elements are periodically deleted from the VNLS,
   wherein each of the snapshots further comprise an identity of a trigger associated with the snapshot, a priority of the trigger associated with the snapshot, a timestamp of the event associated with the snapshot, and a data size of the snapshot.

2. The VNLS of claim 1, wherein the first subset of the plurality of data elements are offloaded to cloud storage.

3. The VNLS of claim 1, further comprising a flusher for deleting the second subset of data elements from the VNLS data elements.

4. The VNLS of claim 1, wherein each of the edge recorders record data from a plurality of passive data sources.

5. The VNLS of claim 1, wherein the passive data sources comprise onboard sensors of a vehicle.

6. The VNLS of claim 1, wherein each of the active data sources comprise a plurality of topics.

7. The VNLS of claim 1, wherein the active data source packages data into a form parseable by the VNLS.

8. The VNLS of claim 1, wherein each data element of the plurality of data elements stores timestamped data received from at least one of the sources over a fixed time period F.

9. The VNLS of claim 1, wherein each of the logstreams has associated therewith a rolling hold time window.

10. A method for performing selective logging in a vehicle network logging system (VNLS), the method comprising:
    recording by a plurality of recorders data from data sources, the recorders generating from the recorded data data elements comprising a logstream, wherein each of the data elements comprises an interval of the recorded data and includes a timestamp indicative of a beginning time of the interval;
    generating by a trigger manager a snapshot in connection with a trigger received from a trigger control module, wherein the snapshot links to a first subset of the data elements containing data related to an event associated with the trigger; and
    periodically deleting by a flusher a second subset of the data elements comprising ones of the data elements that are outside a rolling hold time window associated with the logstream and that are not part of the first subset of the data elements,
    wherein the snapshot comprises one or more of an ID of the trigger associated with the snapshot, a priority of the trigger associated with the snapshot, a timestamp of the event associated with the snapshot, and a data size of the snapshot.

11. The method of claim 10, further comprising storing the first subset of the data elements for subsequent offloading.

12. The method of claim 11, wherein the first subset of the data elements are stored on a solid-state drive.

13. The method of claim 10, wherein the sources comprise at least one of an automated driving system computer (ADSC) of a vehicle and onboard sensors of the vehicle.

14. The VNLS of claim 1, wherein the passive data sources are data sources that are unaware of the edge recorders.

15. The method of claim 10, wherein the passive data sources are data sources that are unaware of the edge recorders.

16. A non-transitory computer-readable memory device, which stores instructions for performing selective logging in a vehicle network logging system (VNLS), the instructions when executed by a processor cause the VNLS to:
    record by a plurality of recorders data from data sources, the recorders generating from the recorded data data elements comprising a logstream, wherein each of the data elements comprises an interval of the recorded data and includes a timestamp indicative of a beginning time of the interval;
    generate by a trigger manager a snapshot in connection with a trigger received from a trigger control module, wherein the snapshot links to a first subset of the data elements containing data related to an event associated with the trigger; and
    periodically delete by a flusher a second subset of the data elements comprising ones of the data elements that are outside a rolling hold time window associated with the logstream and that are not part of the first subset of the data elements,
    wherein the snapshot comprises one or more of an identifier of the trigger associated with the snapshot, a priority of the trigger associated with the snapshot, a timestamp of the event associated with the snapshot, and a data size of the snapshot.

* * * * *